United States Patent
Sharma et al.

(10) Patent No.: US 12,412,109 B2
(45) Date of Patent: Sep. 9, 2025

(54) MACHINE LEARNING DEPLOYMENT PLATFORM

(71) Applicant: Xilinx, Inc., San Jose, CA (US)

(72) Inventors: Varun Sharma, Toronto (CA); Aaron Ng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 819 days.

(21) Appl. No.: 17/649,912

(22) Filed: Feb. 3, 2022

(65) Prior Publication Data
US 2023/0244966 A1   Aug. 3, 2023

(51) Int. Cl.
*G06N 5/043* (2023.01)
*G06N 20/00* (2019.01)

(52) U.S. Cl.
CPC ............. *G06N 5/043* (2013.01); *G06N 20/00* (2019.01)

(58) Field of Classification Search
CPC .................................................. G06N 20/00
See application file for complete search history.

(56) References Cited

U.S. PATENT DOCUMENTS

2015/0379424 A1* 12/2015 Dirac ............... G06N 20/00 706/12
2020/0027210 A1* 1/2020 Haemel ............ G06F 9/547

OTHER PUBLICATIONS

Li, Zhuozhao, et al. "DLHub: Simplifying publication, discovery, and use of machine learning models in science." Journal of Parallel and Distributed Computing 147 (2021): 64-76. (Year: 2021).*
NVIDIA Triton Inference Server, NVIDIA Developer, https://developer.nvidia.com/nvidia-triton-inference-server, 8 pages.

* cited by examiner

*Primary Examiner* — Eric Nilsson
(74) *Attorney, Agent, or Firm* — Kevin T. Cuenot

(57) ABSTRACT

An inference server is capable of receiving a plurality of inference requests from one or more client systems. Each inference request specifies one of a plurality of different endpoints. The inference server can generate a plurality of batches each including one or more of the plurality of inference requests directed to a same endpoint. The inference server also can process the plurality of batches using a plurality of workers executing in an execution layer therein. Each batch is processed by a worker of the plurality of workers indicated by the endpoint of the batch.

19 Claims, 8 Drawing Sheets

MACHINE LEARNING DEPLOYMENT PLATFORM

TECHNICAL FIELD

This disclosure relates to machine learning and, more particularly, to a machine learning deployment platform.

BACKGROUND

Machine learning is a technology that is widely used in many different applications. A non-exhaustive list of applications in which machine learning may be used includes image processing, speech recognition, medical diagnosis, and predictive analysis. In general, machine learning involves a training phase and an inference phase. The training phase, or simply "training," refers to the process of tuning a machine learning model to perform a particular task. The inference phase, or simply "inference," refers to the process of performing a task, e.g., making a prediction, on new data using a trained machine learning model.

A software platform, referred to as a "machine learning framework," may be used to perform both training and inference. That is, the machine learning framework may be used to train a machine learning model. In general, machine learning models are tightly integrated with the particular machine learning framework that is used for training. Subsequent to training, the machine learning framework may execute the trained machine learning model to perform inference. The machine learning model generated by a given machine learning framework is often compatible for purposes of inference only with the machine learning framework used to train the machine learning model. For this reason, concurrent use of different machine learning models from different machine learning frameworks is difficult in practice.

Though machine learning frameworks are used to execute machine learning models for performing inference, it is often the case that the machine learning frameworks are not implemented with a focus on running the machine learning models in a highly optimized manner, thereby necessitating the use of hardware acceleration. Though a variety of different hardware accelerators are available, the machine learning framework often defines a single type of hardware accelerator that may be used.

An inference server refers to server software executing in a data processing system to which client systems may make requests for inference jobs. The inference server is capable of receiving a client request for an inference job via an accepted communication protocol, submitting the request to a machine learning framework for inference processing, and returning any response received from the machine learning framework to the client system that made the request.

SUMMARY

In one or more example implementations, a method can include receiving, by an inference server, a plurality of inference requests from one or more client systems. Each inference request specifies one of a plurality of different endpoints. The method can include generating, by the inference server, a plurality of batches each including one or more of the plurality of inference requests directed to a same endpoint. The method can include processing the plurality of batches using a plurality of workers executing in an execution layer of the inference server. Each batch is processed by a worker of the plurality of workers indicated by the endpoint of the batch.

In one or more example implementations, a system includes a processor configured to initiate operations. The operations can include receiving a plurality of inference requests from one or more client systems. Each inference request specifies one of a plurality of different endpoints. The operations can include generating a plurality of batches each including one or more of the plurality of inference requests directed to a same endpoint. The operations can include processing the plurality of batches using a plurality of workers executing in an execution layer of the inference server. Each batch is processed by a worker of the plurality of workers indicated by the endpoint of the batch.

In one or more example implementations, a computer program product includes one or more computer readable storage media, and program instructions collectively stored on the one or more computer readable storage media. The program instructions are executable by computer hardware to initiate operations. The operations can include receiving a plurality of inference requests from one or more client systems. Each inference request specifies one of a plurality of different endpoints. The operations can include generating a plurality of batches each including one or more of the plurality of inference requests directed to a same endpoint. The operations can include processing the plurality of batches using a plurality of workers executing in an execution layer of the inference server. Each batch is processed by a worker of the plurality of workers indicated by the endpoint of the batch.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
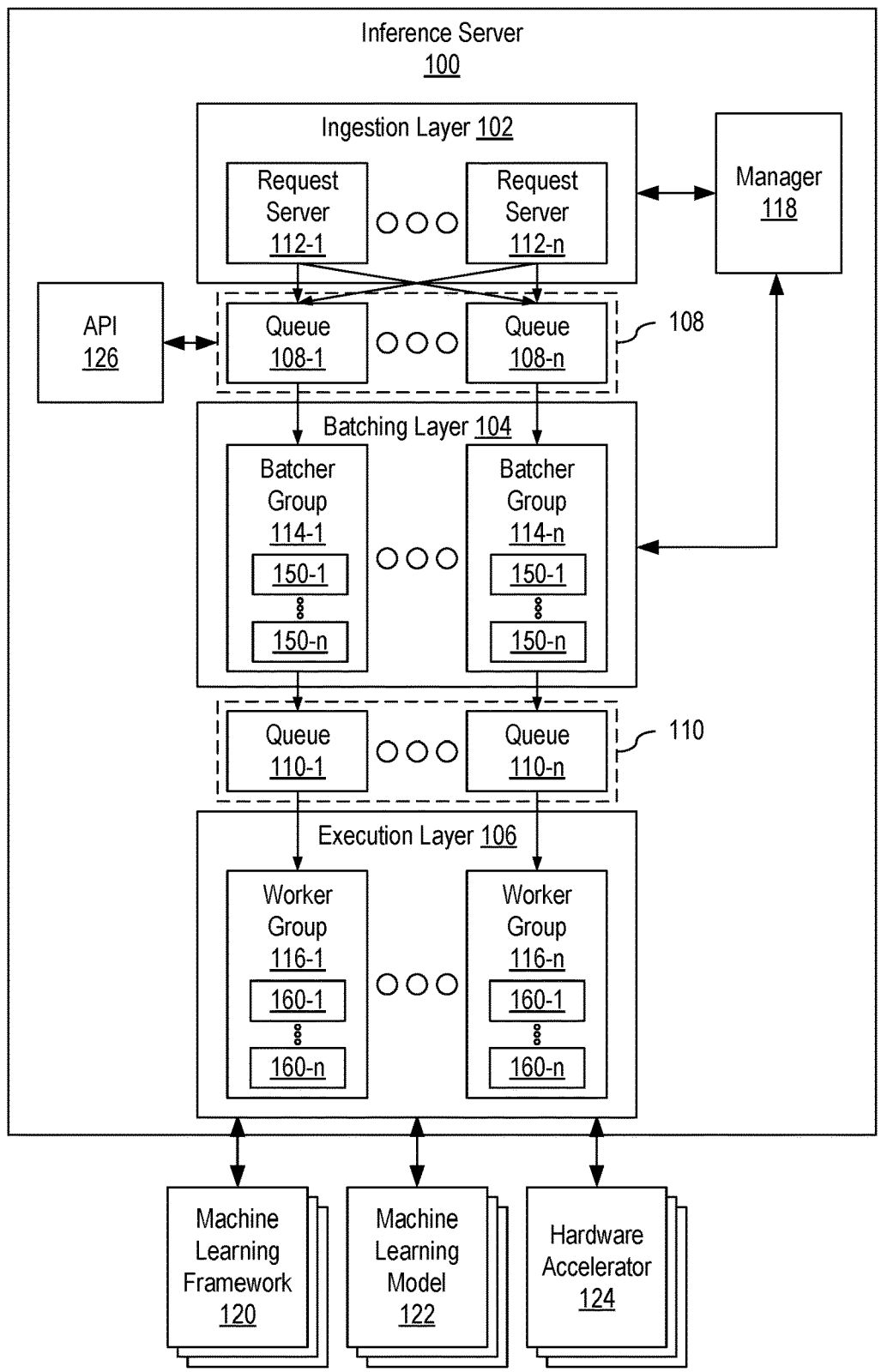
FIG. 1 is an example software architecture for an inference server in accordance with the inventive arrangements described herein.

This disclosure relates to machine learning and, more particularly, to a machine learning deployment platform. In accordance with the inventive arrangements described within this disclosure, methods, systems, and computer program products relating to an architecture for an inference server are provided. The inference server architecture facilitates concurrent interaction with, and concurrent use of, multiple, different machine learning platforms for purposes of performing inference.

In one or more example implementations, the inference server utilizes a multi-layered software architecture. The different layers of the software architecture may be implemented in different threads to allow the different layers to execute concurrently thereby reducing idle time of the respective layers. In one aspect, the layers may be defined according to different phases of computation performed by the inference server. As an illustrative example, the layers may include an ingestion layer, a batching layer, and an execution layer. The layers may communicate with one another via one or more high-performance queues. By using a multi-threaded approach in combination with the high-performance queues, the computations performed by the inference server, across the layers and within the layers, may overlap in time. Further, multiple requests to one or more different machine learning platforms may be issued, thereby ensuring that the machine learning platforms remain busy so as to improve performance.

Within this disclosure, the term "machine learning platform" is used to refer to a particular machine learning framework (e.g., an executable machine learning framework), a particular machine learning model (e.g., an executable machine learning model), or a particular hardware accelerator. The term "hardware accelerator" means a physical device that is capable of performing tasks or operations. The hardware accelerator is often implemented as an integrated circuit (IC). A hardware accelerator may specify a particular type of such device. Examples of different hardware accelerators may include, but are not limited to, Graphics Processing Units (GPUs), programmable ICs (e.g., Field Programmable Gate Arrays or "FPGAs"), System-on-Chips (SoCs), and Application-Specific ICs (ASICs). With reference to the example hardware accelerators, it should be appreciated that regardless of the particular type of hardware accelerator, these different types may have overlap in terms of the types of subsystems and/or circuit blocks disposed in each. For example, one or more or each of the different examples of hardware accelerators may include programmable circuitry (e.g., programmable logic), one or more processors capable of executing program code, a processor array, one or more special purpose hardened circuit blocks, and/or other types of subsystems in any combination.

The example implementations described within this disclosure are capable of providing increased flexibility in that the inference server is operable with multiple, different machine learning platforms. Moreover, the examples described herein may use such machine learning platforms concurrently or simultaneously. In one example, the inference server may concurrently use two or more different machine learning frameworks, concurrently use two or more different machine learning models running on different machine learning frameworks, concurrently use two or more different hardware accelerators (e.g., a GPU and an FPGA, a GPU and an ASIC, or any combination of the examples provided or other known or "to be developed" hardware accelerators), or any combination of two or more machine learning frameworks, machine learning models, and/or hardware accelerators. Further aspects of the inventive arrangements are described below with reference to the figures.

FIG. 1 is an example software architecture for an inference server 100 in accordance with the inventive arrangements described herein. Inference server 100 may be implemented as program code that may be executed by one or more interconnected or networked data processing systems. An example of a data processing system, e.g., a computer, that is capable of executing inference server 100 is described in connection with FIG. 8.

In the example of FIG. 1, inference server 100 includes an ingestion layer 102, a batching layer 104, and an execution layer 106. Ingestion layer 102 is communicatively linked to batching layer 104 via a first set of one or more queues 108 (e.g., 108-1 through 108-n). Batching layer 104 is communicatively linked with execution layer 106 via a second set of one or more queues 110 (e.g., 110-1 through 110-n).

Ingestion layer 102 may include one or more request servers 112 (e.g., 112-1 through 112-n). Batching layer 104 may include one or more batcher groups 114 (e.g., 114-1 through 114-n), where each batcher group 114 includes one or more batchers 150. Execution layer 106 may include one or more worker groups 116 (e.g., 116-1 through 116-n), where each worker group 116 includes one or more workers 160. Inference server 100 also includes a manager 118 that is communicatively linked with ingestion layer 102 and batching layer 104.

In the example of FIG. 1, ingestion layer 102 is the top layer of the software architecture. Ingestion layer 102 is configured to receive requests from one or more client systems. The requests may be for inference processing. Ingestion layer 102 may include one or more request servers 112. In the example, each request server 112 may be implemented to communicate with client systems (e.g., receive and process requests) using a particular definition or communication protocol. As an example, one request server 112 may implement a HyperText Transfer Protocol server capable of communicating using Representational State Transfer (REST), while another request server 112 may communicate via Remote Procedure Call (RPC) such as gRPC, while another request server 112 may communicate using WebSocket. Thus, ingestion layer 102 is capable of supporting one or more different request methods and may be augmented with additional request servers 112 to support other methods over time thereby providing flexibility for supporting a variety of different client systems and request formats or protocols.

In another aspect, inference server 100 may include or implement an Application Programming Interface (API) 126 through which a client system may submit an inference request. As an illustrative and nonlimiting example, the API 126 may be a C/C++ based API. In one example implementation, the API 126 may be accessed and directly communicate with one or more queues 108 to access batchers 150 within batching layer 104. Though not illustrated as part of ingestion layer 102, in another aspect, API 126 may be implemented as part of ingestion layer 102.

In one or more example implementations, each request server 112 implemented in the ingestion layer 102 may execute in its own thread of execution. In some example implementations, one or more or all of request servers 112 may execute a plurality of threads of execution. The example software architectures described herein facilitate concurrent execution of the various request servers 112 executing as part of the ingestion layer 102.

In the example of FIG. 1, ingestion layer 102 is capable of distinguishing between different types of requests from client systems. For example, certain types of requests may be control and/or administrative in nature (e.g., requests to load and/or unload workers 160) and, as such, may be routed by ingestion layer 102 to manager 118. Other requests that specify data to be operated on by the one or more machine learning platforms, e.g., inference requests, are routed along the data path within inference server 100 that flows from ingestion layer 102, to batching layer 104, to execution layer 106.

Each of the request servers 112 is capable of receiving requests in a particular format. Each of the request servers 112, in response to receiving an inference request, is capable of formatting the received inference request into an "interface object." The interface object is a common object that is used across the different request servers 112 and is common across the various communication protocols accepted by inference server 100. Each request, being transformed into an interface object, may be provided to the batching layer 104.

Within each interface object, the original request may continue to exist in its native form. That is, the original request may be included in the interface object without modification. For example, within the context of a C++ implementation, inheritance may be used where a base interface object class is provided as part of inference server 100 and extended to meet the requirements of particular request servers 112. Each different request server 112 is capable of instantiating interface objects of the type (e.g., as extended) corresponding to that respective request server 112. In one aspect, the generated interface objects have an internal method that is executable to copy the internal data of the interface object, e.g., the request in the original format, to a buffer located at a specified address (e.g., offset). The method may be utilized by other entities in inference server 100 such as, for example, a particular batcher 150 in a batcher group 114. As new request formats are added to ingestion layer 102, such request formats may be supported by adding a new interface definition so that the method added to each interface object is capable of accessing the data therein. In an example implementation, the base interface class defines this method. The method may be left unimplemented. Each extension of the interface object, which corresponds to a particular one of the request servers 112, provides an implementation of this method. Each request server 112 is capable of passing the generated interface objects on to batching layer 104 by way of queues 108. Use of the interface object and the added method allows the entity receiving the interface object, e.g., the particular batcher 150 of a particular batcher group 114, to access any data included therein (e.g., the data of the original request) without knowing where the request originated or how the request may be formatted within the interface object.

In one or more example implementations, incoming requests to ingestion layer 102 may query manager 118 to determine the particular endpoint (e.g., worker group 116) to which the inference request should be provided. The response to the query may include a pointer to a particular batcher group 114.

Batching layer 104 is capable of receiving the interface objects from ingestion layer 102 by way of queues 108. In general, batching layer 104 is capable of extracting data from each interface object that is received and grouping requests into batches. The generated batches may be passed on to the execution layer 106 by way of queues 110. The grouping, or batching, of a plurality of requests into a contiguous region of memory as a "batch" (e.g., a plurality of requests sent in bulk), leverages aspects of many machine learning platforms and, in particular hardware accelerators, that are configured to operate on batches of jobs as opposed to receiving a large number of jobs on an individual basis, e.g., one-by-one. Thus, the batching layer 104, in batching the inference requests, improves throughput of the inference server 100.

Within this disclosure, the term "batcher group" refers to one, two, or more identical batchers that receive interface objects from a same queue 108 and output batches to a same queue 110. In this regard, each batcher group implements a logical grouping of identical batchers 150 that correspond to a set of queues (e.g., a particular queue 108 and a particular queue 110) and a particular worker group 116. Though batchers 150 may be organized in logical groupings, it is individual batchers 150 that service incoming requests. For example, one batcher 150 services one request.

The term "worker group" refers to one, two, or more identical workers that operate on batches from a same queue 110. In general, and in the example of FIG. 1, each batcher group 114 is paired with, and corresponds to, a particular worker group 116. Each batcher group 114 is, in turn, paired with a particular queue 108. Thus, using the information provided from the manager 118, each request server 112 is capable of providing the generated interface object to the particular queue 108 corresponding to the particular batcher group 114 paired with the particular worker group 116 to which the inference request is directed. This allows different ones of request servers 112 to direct interface objects to different ones of the batcher groups 114. A given batcher group 114-1, for example, may receive requests from different ones of request servers 112 (e.g., corresponding to different request formats).

Each of batcher groups 114 is capable of receiving interface objects from a particular one of queues 108. A batcher 150 of a batcher group 114 receives an interface object and executes the method included therein to extract the data from the received interface object. In general, the method copies the data from the interface object to a buffer. The batcher 150 performs this operation to construct a batch in the buffer that includes a plurality of different inference requests. A batcher 150 may batch the requests so that the batches that are generated include a specified number of requests or batch requests for a particular amount of time and forward the batch in response to expiration of that amount of time despite not having the specified number of requests included therein. Inference server 100 supports the use of different types of batchers 150 executing simultaneously. As an example, some worker groups 116 may use a first type of batcher 150 that waits for a specific number of requests, while another worker group 116 may use a second type of batcher 150 that times out after some defined amount of time and sends the batch as formed at that time (e.g., with fewer requests).

In performing the batching, each batcher 150 of a batcher group 114 receives the interface objects from the associated queue 108. As noted, a given queue 108 for a given batcher group 114 may include interface objects including requests of different formats from different ones of the request servers 112. Each batcher 150 of a batcher group 114, in servicing the associated queue 108, uses the method of the interface object to coalesce the requests from these different communication protocols into a single batch that may be passed on to the paired worker group 116. That is, each of the requests within the batch is directed to a particular and same worker group 116 that is configured to use a particular, e.g., same, machine learning platform. Using this architecture, batchers are capable of processing all requests without knowing where each particular request originated or how such request is internally represented or formatted.

In the example of FIG. 1, each batcher 150 may execute in its own thread of execution. This allows for concurrent operation of the batchers 150. The batching operations described effectively combine multiple smaller requests from the client systems into one large request, e.g., a batch, to improve the performance of various machine learning platforms including those that may utilize hardware accelerators.

In an example implementation, each batcher 150 of a batcher group 114 defines a run method that must be implemented and that runs in a separate thread. This method dequeues incoming interface objects from the corresponding queue 108, combines the requests from the dequeued interface objects into one batch (e.g., a "batch object"), and pushes the batch into the corresponding queue 110 used to communicate with the paired worker group 116. The use of queues 108 to feed batchers 150 decouples the batchers 150 from the communication protocol used by the client systems so that time required to perform batching does not block the requests being received from the client systems.

Execution layer 106 is the layer of the inference server 100 that is responsible for performing the computations or work. Each worker 160 of a worker group 116 may be implemented in a shared library. Each worker 160 effectively implements an interface between the inference server 100 and a machine learning platform. In the example, execution layer 106, by way of the workers 160, is capable of communicating with one or more machine learning platforms such as one or more machine learning frameworks 120, one or more machine learning models 122, and/or one or more hardware accelerators 124 (e.g., GPUs, FPGAs, SoCs, ASICs, etc.).

The interface implemented by the workers 160 defines how the workers 160 are dynamically loaded at runtime of inference server 100 and the methods that exist defining the lifecycle of the workers 160. Manager 118, for example, is capable of loading new workers 160 during runtime as needed and unloading workers 160 during runtime without stopping operation of inference server 100. In an example implementation, each worker 160 of a worker group 116 and/or each batcher 150 of a batcher group 114 may be treated as a "black-box" where the inner workings are hidden from the inference server 100. Each worker 160, for example, may incorporate custom logic and may be designed to interface with a particular machine learning platform. Each worker 160 is capable of submitting inference jobs to the particular machine learning platform with which the worker 160 is intended to operate. Manager 118 is capable of managing multiple independent workers 160 and/or worker groups 116 concurrently.

As discussed, in the example of FIG. 1, each batcher group 114 is paired with a particular worker group 116. The batchers 150 of the batcher group 114 push batches into the particular queue 110 that communicatively links the batcher group 114 with the paired worker group 116. In one example implementation, each worker can independently specify a particular batcher implementation (e.g., type of batcher) to use. Within inference server 100, for example, a base worker class may define a method that provides a default batcher implementation to use for the worker 160. This default batcher implementation may be overridden with a custom batcher implementation when the worker 160 is brought up or loaded by manager 118. This functionality supports workers 160 that may have special batching requirements that are not addressed by the default batcher.

In the example of FIG. 1, each worker 160 may execute in its own thread of execution. This facilitates concurrently operation of each worker 160 within inference server 100. Since multiple workers 160 can execute concurrently, multiple kinds of batchers 150 may also be running simultaneously. In one aspect, each worker group 116 is capable of specifying the batch size that batchers 150 of the paired batcher group 114 are to use. In general, the architecture described herein allows workers to specify or define the particular batching logic to be used in creating batches since the worker 160 ultimately consumes the batches that are generated.

While the manager 118 does not have direct visibility into the internal operations of the workers 160, the manager 118 is capable of observing certain operational aspects of inference server 100 such as the queues 108, 110 associated with the workers 160 as a metric for determining how the workers 160 are performing. Though implemented as a "black box," in one aspect, the run method of the workers 160 must accept incoming batches from a queue and operate on the batches. This framework for execution layer 106 provides flexibility in terms of what operations are allowed.

As discussed, the workers 160 operate as the mechanism for accessing and communicating with machine learning platforms. In another example, one or more of the workers 160 may be written to run purely on a processor (e.g., natively on the CPU of the computing system executing inference server 100). In this regard, such workers 160 may run purely on the CPU to implement a particular functionality (e.g., without accessing a machine learning platform), may spawn new threads of execution, and/or may access any of the various machine learning platforms as described.

In another aspect, the workers 160 may be configured to handle any internal exceptions that may occur during execution. The manager 118, for example, is capable of handling exceptions that occur during bring up lifecycle methods as the workers 160 initialize. In such cases, the manager 118 is capable of rolling back the internal state of the inference server 100 and returning an error to the requesting client system.

In response to exceptions occurring at runtime while processing a batch, for example, the worker 160 may use a callback function provided with the request of a batch. The callback function, when invoked, is capable of returning an error message back to the client system that issued the particular request for which an exception occurred.

In the examples described, the workers 160 may execute as trusted entities within the inference server 100. In another example implementation, one or more workers 160 that may be considered untrusted within inference server 100 may be executed as separate processes so that the processes may be terminated safely without compromising operation of inference server 100 that could otherwise occur were the untrusted worker(s) 160 executed in a separate thread of execution.

Figure 2:
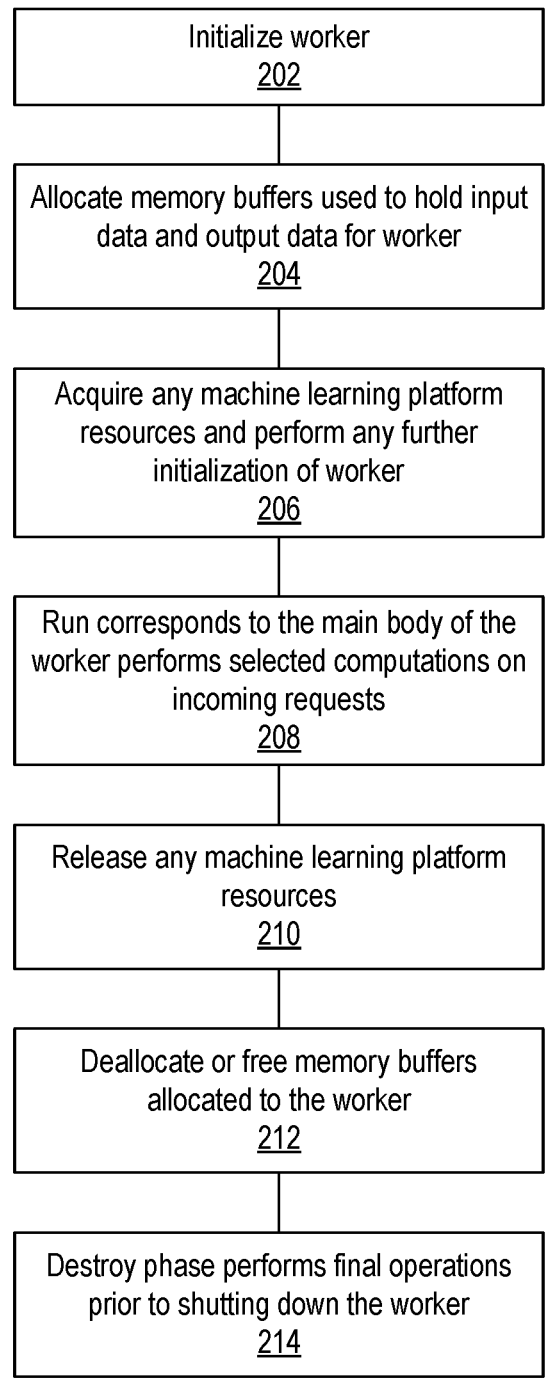
FIG. 2 is a flow chart illustrating an example lifecycle of a worker within an inference server.

FIG. 2 is a flow chart illustrating an example lifecycle of a worker 160 within inference server 100. In the example of FIG. 2, each block corresponds to a particular phase of the lifecycle of a single worker 160. The phases may be performed by, for example, the manager 118, invoking particular functions provided by the worker 160.

In block 202, the worker 160 may be initialized. The initialization of the worker 160 in block 202 may include low-cost initialization operations. In block 204, the worker 160 allocates memory buffers. The memory buffers are used by the worker 160 to hold or store input data (inference requests) and output data (e.g., inference results). In block 206, the worker 160 is capable of acquiring machine learning platform resources. In one aspect, the worker 160 is capable of acquiring any hardware resources of the machine learning platforms including any hardware accelerators. As part of block 206, the worker 160 may also perform any additional initialization that may be required. The additional initialization performed in block 206 may include any high-cost initialization operations. Examples of initialization operations that may be considered high-cost can include, but are not limited to, hardware related operations such as initializing registers in hardware (e.g., of hardware accelerators). Another example of an initialization operation that may be considered high-cost can include initializing memory to known values.

In block 208, the worker 160 is capable of performing any selected computations on incoming requests. The worker 160, for example, may include a run method as the main body that is configured to initiate processing of the requests received as batches from the corresponding or paired batcher group 114. In block 210, the worker 160 may release any machine learning platform resources that were acquired in block 206. In block 212, any buffers that were allocated by the worker 160 may be deallocated or freed. In block 214, the destroy phase implements or performs any final operations prior to shutting down the worker 160.

In general, blocks 202, 204, and 206 correspond to setting up the worker 160 for execution in the execution layer 106. Blocks 210, 212, and 214 tear down the worker 160 by effectively reversing or undoing the operations of blocks 202, 204, and 206 in the reverse order. In general, the methods implementing the lifecycle of the worker 160 form a contract between workers 160 and inference server 100 as to how workers 160 are to operate.

In one or more example implementations, the lifecycle of a worker 160 may exist in different phases of bring up and/or tear down. For example, inference server 100, e.g., manager 118, is capable of partially tearing down workers 160 that are determined to be idle. In illustration, in response to determining that a worker 160 is not servicing requests, manager 118 is capable of requesting that the worker 160 give up any machine learning platform resources that were acquired by the worker 160 in block 206 while not completely tearing down the worker 160. That is, the worker 160 may retain any allocated buffers and remain in existence. Accordingly, in response to a new request being received that is directed to the worker 160, the worker 160 is partially ready for operation. The worker 160 may be placed into operation in less time than had the worker 160 been completely torn down.

For purposes of illustration, consider an example in which a worker is 160 started. To start a worker 160, the manager 118 loads the shared library for a worker 160. The manager 118 may then create an instance of the worker 160. The manager 118 may then call the initialization method of the instantiated worker 160. The manager 118 may then prepare a buffer pool for the worker 160 to use and invoke the allocate method of the instantiated worker 160 to populate the buffer pool. The manager 118 may then invoke the acquire method of the worker 160 to reserve any machine learning platform resources and/or perform any further initialization of the instantiated worker 160. The manager 118 may then invoke the run method of the instantiated worker 160 in a new thread of execution.

Figure 3:
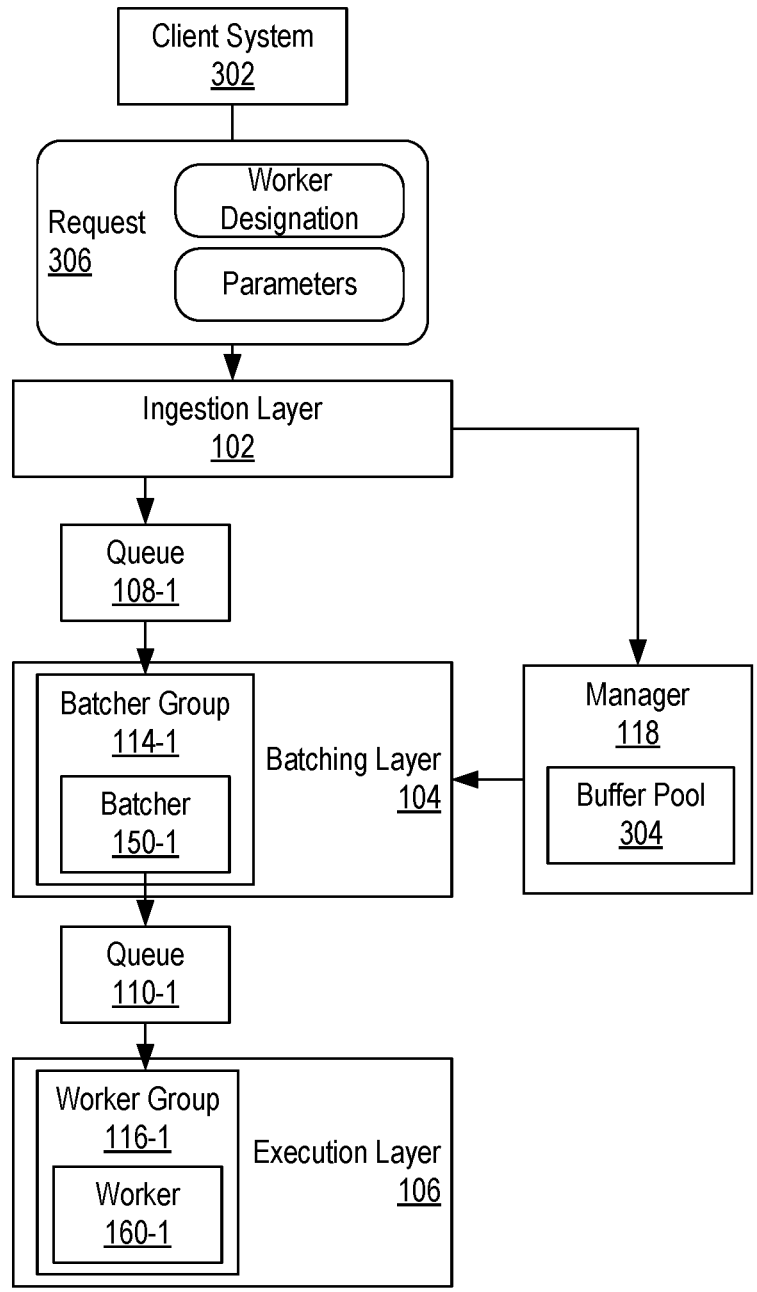
FIG. 3 illustrates a simplified example of starting a worker in an inference server.

FIG. 3 illustrates a simplified example of starting a worker 160-1. In the example of FIG. 3, a client system 302 provides a request 306 to the ingestion layer 102 of the inference server 100. Request 306 may be a request for a particular endpoint. Each endpoint uniquely specifies a particular worker group 116. Thus, each worker group 116 has a unique endpoint that may be requested. In the example, the request 306 may specify a particular endpoint by way of specifying a worker designation (e.g., the particular worker and/or worker type that is being requested by address and/or by worker name). In addition, the request 306 may optionally specify one or more parameters. The parameters, if specified, are load-time parameters used for the worker(s) 160 of the specified endpoint (e.g., worker group 116-1). The information in request 306, e.g., the worker designation and optionally the parameters, taken collectively, uniquely maps to a particular endpoint. This endpoint may be returned to client system 302 as a response to the (load) request 306. Client system 302 may use the endpoint to make subsequent requests to worker group 116-1 so configured with any of the parameters if specified. The parameters provide client systems with a way of providing optional configuration data to the endpoint being requested. Workers 160 of a same type with different parameters are considered different workers 160 and, as such, are logically grouped into different worker groups 116. Workers 160 of the same type and with the same parameters are considered identical and are logically grouped into a same worker group 116. Workers 160 of a different type are also considered different and are logically grouped into different worker groups 116 regardless of any similarity in parameters.

In an example implementation, the configuration data specified by the parameters may be one of four types including integer, float, Boolean, or string. The configuration data may be provided to the worker group 116-1 in the startup portion of the lifecycle described in connection with FIG. 2. In one aspect, the load-time parameters may be specified as key-value pairs that may be sent by the client system. These parameters may be passed as arguments to the worker(s) 160 being initialized, e.g., in blocks 202, 204, and/or 206 of FIG. 2. In each of these blocks, also referred to as initialization stages, the worker may choose to evaluate the value for one or more key value pairs. If a particular parameter value is specified, the worker 160 may use the parameter value to change some aspect of the behavior of the worker 160. For example, the worker 160 may define a default batch size but allow a client system to pass in a custom value that will be used by the worker 160 if specified. This allows each worker 160 to optionally use one or more parameter values so that each respective worker 160 is able to control what options are available for client systems to override at each initialization stage (e.g., blocks 202, 204, 206). In addition, the worker 160 may ignore any unneeded or extra parameters that may be provided by client systems without generating an error. The same parameters, e.g., key-value pairs, may be passed to each of blocks 202, 204, and/or 206 where different ones of the blocks may utilize different parameter values.

In an example implementation, manager 118 is capable of storing within a data structure the worker designation and parameters (if provided) of received requests corresponding to workers 160 that are loaded or operating in inference server 100. Manager 118 is capable of comparing the worker designation and parameters of request 306 with those of the data structure to determine whether those of request 306 match those of a worker group 116 that has already been loaded or started in inference server 100. In response to determining that the combination of worker designation and parameters of request 306 is unique, e.g., does not have a match in the data structure, manager 118 creates a new endpoint and starts worker group 116-1, being identified by the created endpoint. In the example, worker 160-1 is started in a new thread of execution. Manager 118 may continue to manage the newly loaded worker group 116-1.

In the case where manager 118 starts a new worker group 116-1, the newly instantiated worker group 116-1 specifies the batcher group 114-1 to be used in batching layer 104. In one aspect, the number of batchers 150 to be implemented in batcher group 114-1 may be set by the first worker (e.g., worker 160-1) instantiated in worker group 116-1. In one aspect, subsequent workers 160 added to worker group 116-1 may share the existing instantiated batcher(s) 150 of the corresponding batcher group 114-1. In another aspect, a new batcher 150 may be instantiated in batcher group 114-1 in response to instantiating a new worker 160 in worker group 116-1 automatically or only responsive to detecting particular value(s) of load-time parameters.

As illustrated in FIG. 3, the buffer pool 304 is allocated to worker group 116-1. Buffers from buffer pool 304 are used to hold batches generated in batching layer 104 and data that is generated from inference operations performed or initiated by worker group 116-1. As discussed, worker group 116-1 is capable of starting a particular type of batcher 150 as part of batcher group 114-1. Each worker 160 of worker group 116-1 can specify the batcher type to use. Since all workers 160 in a given worker group 116, e.g., worker group 116-1, are identical, the batcher specification for each batcher 150 in the corresponding batcher group 114-1 is guaranteed to be the same.

The example of FIG. 3 illustrates processing of a request to start a worker 160 from client system 302. Subsequent inference requests received from client system 302 that are directed to worker group 116-1 will flow through ingestion layer 102. Ingestion layer 102 transforms the inference request into an interface object that is stored in queue 108-1, which corresponds to the batcher group 114-1 and worker group 116-1 pair. The request from the interface object is placed into a batch by batcher 150-1, stored in a buffer from buffer pool 304, and placed in queue 110-1 for consumption by worker 160-1 of worker group 116-1.

In another aspect, in response to determining that the combination of worker designation and parameters of request 306 does match those of an existing or operating worker 160, manager 118 may drop request 306 without taking any further action. The behavior of manager 118 may be implemented to preserve memory usage and minimize the number of duplicate resources that are used. In this example, the manager 118 determines that a worker group 116 (e.g., worker group 116-1) that is capable of satisfying the request is already loaded and executing.

In another example implementation, a client system may force the loading of a new worker 160 by providing appropriate load-time parameters as part of request 306. In that case, manager 118 is capable of starting a new worker 160 in a new thread of execution where the newly created worker operates as part of the existing worker group 116-1 (e.g., a second worker 160 is added).

As discussed, in one or more example implementations, the instantiation of a new batcher 150 may be forced by a client system by providing appropriate parameters as part of request 306 similar to the process described with respect to forcing the instantiation of a new worker 160. More workers 160 and/or more batchers 150 also may be added subsequently, e.g., during runtime, as described hereinbelow in response to any detected need for such additional resources.

Regarding buffer management in inference server 100, the allocate method of the worker lifecycle is capable of populating buffer pool 304 with some number of buffers that are used to hold the data of incoming batches. Using buffer pool 304 as illustrated in FIG. 3 saves the cost of constantly allocating dynamic memory for each new request that is received. Instead, inference server 100, in using buffer pool 304, is capable of reusing the same set of buffers that are allocated by the worker group 116 at one time.

In addition, by making the worker group 116-1 allocate the memory, inference server 100 allows heterogeneous workers 160 to choose the particular buffer implementation that is most preferable for that worker 160 to use. In an example implementation, inference server 100 may define a base buffer class that requires implementations to provide data and write methods. The data method, for example, returns a pointer to the data itself at some offset. The write methods, for example, allow the inference server 100 to write different types of data into the buffer during the batching operation without needing to know the nature of the data being written. The write methods of the buffer implementation also provide a hook for workers 160 to perform on-the-fly type conversion or quantization. As an illustrative and non-limiting example, incoming floating-point numbers may be converted to 8-bit integers when the data is written into the buffer by a batcher 150.

In another aspect, inference server 100 is capable of supporting multiple kinds of buffer backends by using appropriate wrappers. In an example implementation, buffers allocated in CPU memory may be used. For more advanced sharing of data and to minimize data movement, buffers may be allocated in shared memory or on hardware accelerators. Inference server 100 guarantees that the incoming requests as provided to workers will have their associated data in the same type of buffers that the worker 160 chose. Since the worker 160 is aware of what kind of buffers the worker 160 has allocated, the worker 160 also knows that how to cast the buffer to the correct class and how to access the data in the incoming batches efficiently. In an example implementation, a base class of buffers may be provided within inference server 100. The base class of buffers may be extended. Since workers 160 are responsible for creating the buffers and populating the buffer pool, the workers 160 know the actual implementation of the buffer class (e.g., the extension thereof) that is used while the batching layer 104 treats the buffer class as the base buffer class. The term "casting" refers to indicating any data type conversion, e.g., integer to floating point. The worker 160 is capable of converting the base buffer class received from the batching layer 104 to the actual buffer class extension to access specific methods that may be unique to that type that are not found in the generic class.

Within inference server 100, e.g., manager 118, the details of using heterogeneous buffers are abstracted away using the write methods of a generic buffer class. These methods allow the inference server 100 to write particular types into any valid buffer implementation. Accordingly, all buffer implementations must define the methods.

Figure 4:
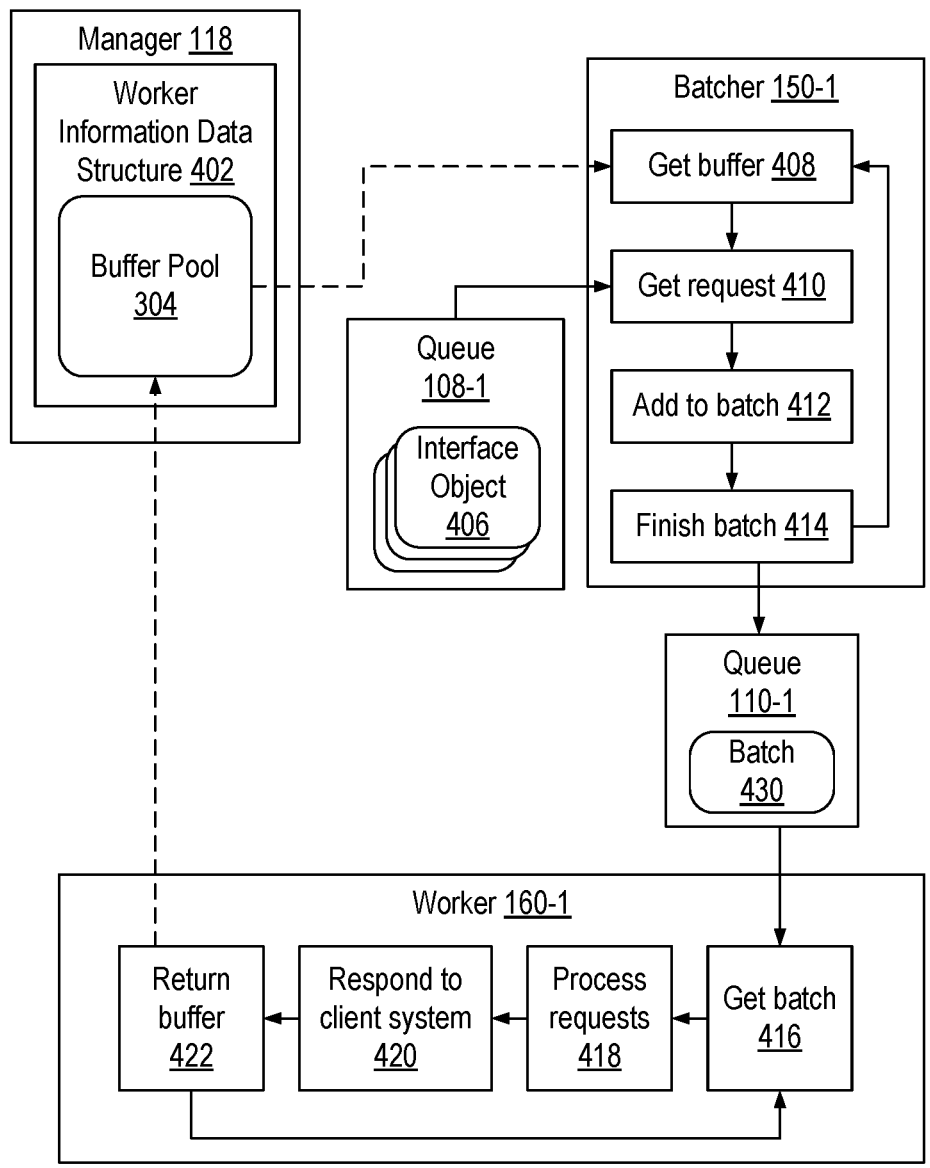
FIG. 4 illustrates an example of buffer lifecycle management within an inference server.

FIG. 4 illustrates an example of buffer lifecycle management within inference server 100. In the example, manager 118 has received a request for an endpoint from a client system. Manager 118 creates a data structure referred to as worker information data structure 402 that is used to store data pertaining to the worker 160-1 to be implemented. The worker information data structure 402 may store buffer pool 304. Buffer pool 304 effectively tracks the state of the buffers and queues corresponding to the requested worker 160-1 so that such data may be shared among different threads of execution (e.g., with batcher 150-1) executing in inference server 100. In the example, initially, manager 118 may maintain worker information data structure 402 including an empty queue to hold buffers. Subsequent to calling the allocated method of worker 160-1, the queue is populated with buffers by the worker 160-1 thereby filling the buffer pool 304.

With regard to runtime processing, interface objects 406 are provided to batcher 150-1. Batcher 150-1 executes block 408 to get a buffer from manager 118 from buffer pool 304. Manager 118 is capable of providing batcher 150-1 with a free buffer from the buffer pool 304 allocated by worker 160-1. In block 410, batcher 150-1 gets one or more requests (e.g., interface objects 406). In block 412, batcher 150-1 is capable of adding requests extracted from the interface objects 406 to a batch within the obtained buffer. In block 414, batcher 150-1 finishes the batch, e.g., batch 430, and provides the finished batch 430 to queue 110-1 that services worker 160-1.

In one or more example implementations, batcher 150-1 may perform an additional "get buffer" operation between blocks 410 and 412 in response to determining that one or more additional buffers are needed to hold requests from the client system. In some example implementations, a request from a client system may include multiple inference requests. In such cases, additional buffers will be needed to accommodate the additional inference requests received in the request from the client system.

Worker 160-1 gets the batch 430 from queue 110-1 in block 416. Worker 160-1 processes the requests from the obtained batch 430 in block 418. In block 420, the worker 160-1 is capable of responding to the client system 302 with the results of the inference request.

Regarding block 420, each worker 160 is capable of replying back to the requesting client system after processing the inference request. In an example implementation, when a client system makes an inference request to inference server 100, a callback function may be added to the interface object by ingestion layer 102 (e.g., by a request server 112). The callback function is a function pointer that accepts an inference response object as an input. Each worker 160, at the end of processing a particular request of a batch, e.g., upon receiving results from a machine learning platform or having computed results natively on the CPU as the case may be, is capable of creating an inference response object to respond back to the requesting client system. Accordingly, for each inference request, the worker 160 is capable of calling the callback function of the inference request with the inference object that is generated. This operation triggers a protocol-specific response mechanism. The exact method of the response from the worker 160 will depend on, e.g., match or be the same as, the initial protocol that was used by the client system in submitting the inference request. Depending on the format of the client request, the callback function will have a different implementation. In block 422, worker 160-1 returns the buffer, which is indicated in buffer pool 304.

In the example of FIG. 4, buffers are initially created by the worker 160-1 and added to a queue that may be maintained by the manager 118. When the batcher 150-1 receives requests, the batcher 150-1 consumes buffers from the buffer pool 304 to hold the batch data. The worker 160-1 returns the buffers to the buffer pool 304 after finishing work on batch 430.

In cases where the batcher 150-1 needs a buffer and no buffers are available in the buffer pool 304, the batcher 150-1 is capable of blocking execution until a buffer of the buffer pool 304 becomes available. In this regard, the number of buffers in the buffer pool 304 controls the number of simultaneous batches for a particular batcher group 114 and worker group 116. If, for example, more simultaneously batches are desired to improve performance (e.g., reduce latency and/or increase throughput of inference sever 100), the number of buffers assigned to the worker group 116 can be dynamically increased by manager 118, though more memory will be consumed.

Figure 5:
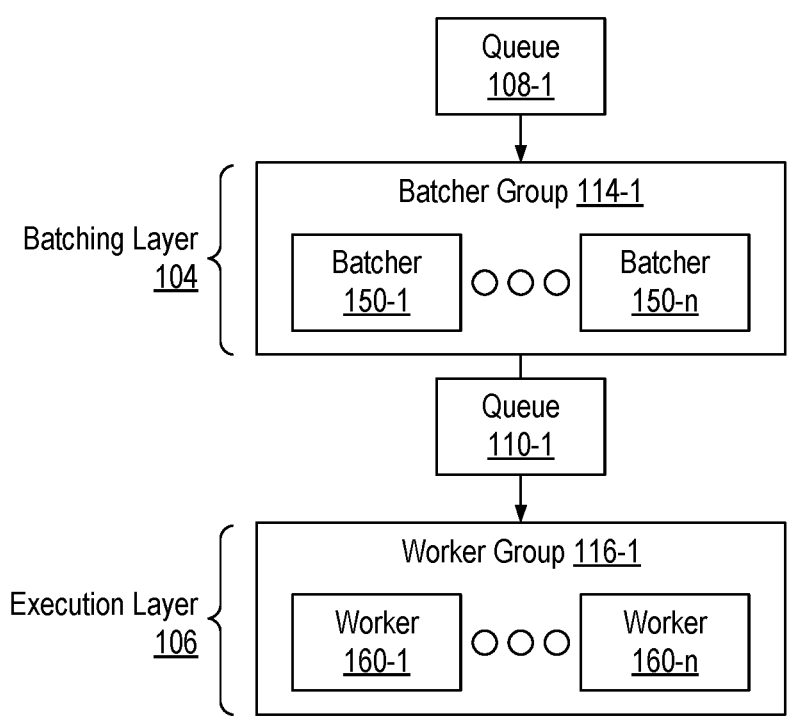
FIG. 5 illustrates an example implementation of batcher groups and worker groups within an inference server.

FIG. 5 illustrates an example implementation of batcher groups 114 and worker groups 116 within inference server 100. As discussed, in cases where a worker 160 is requested that exactly matches a loaded or operating worker 160, e.g., has a same worker designation and same parameters, the manager 118 may start the new worker 160 as part of a worker group 116. Each worker group 116 represents one or more identical workers. Each worker 160 of a same worker group 116 is serviced by the same queue 110. Batchers 150 in a same batcher group 114 are serviced by the same queue 108 and output batches to the same output queue 110.

Referring to FIG. 5, the batching layer 104 includes batcher group 114-1 and the execution layer 106 includes worker group 116-1. It should be appreciated that batching layer 104 may include one or more other batcher groups 114 each formed of one or more batchers 150. Similarly, execution layer 106 may include one or more other worker groups 116 each having one or more workers 160.

Inference server 100 supports multiple instances of batchers 150 grouped into a batcher group 114 and multiple instances of workers 160 grouped into a worker group 116. In the example of FIG. 5, batcher group 114-1 includes a plurality of batchers 150-1 through 150-$n$. Similarly, worker group 116-1 includes a plurality of workers 160-1 through 160-$n$. As discussed, there need not be a one-to-one relationship between the number of batchers 150 within batcher group 114-1 and the number of workers 160 within worker group 116-1. Within worker group 116-1, each of workers 160-1 through 160-$n$ is identical (e.g., has the same worker designation and load-time parameters). Batcher group 114-1 corresponds to worker group 116-1. Each batcher 150 in batcher group 114-1 shares the same input queue 108-1 and output queue 110-1. That is, each batcher 150 in batcher group 114-1 accepts incoming requests (as inference objects) from the same queue 108-1 and pushes the resulting batches to the same queue 110-1 that gets consumed by the downstream worker(s) 160 of worker group 116-1.

In the example, each batcher 150 of batcher group 114-1 is fed interface objects from queue 108-1. Each batcher 150 of batcher group 114-1 further writes batches to queue 110-1. Each worker 160 of worker group 116-1 obtains batches to operate on from queue 110-1. Though multiple batchers 150 may be included in the same batcher group 114-1, each batcher 150 of the batcher group 114-1 executes in its own thread of execution. Similarly, though multiple workers 160 may be included in the same worker group 116-1, each worker 160 of worker group 116-1 executes in its own thread of execution.

Since each worker 160 and each batcher 150 runs in its own thread of execution, the parallelization provides improved performance by allowing multiple batches to be processed at the same time. The work may be fairly distributed to the workers 160 in worker group 116-1 since queues 110 may be implemented as work-stealing queues. In this implementation, each worker 160 of worker group 116-1 is attempting to pull a batch to process (e.g., as stored in a buffer of the buffer pool 304) from queue 110-1. Each worker 160 of the worker group 116-1 only takes a batch to process when able or available to do so. Batchers 150 in batcher group 114-1 are configured to follow the same work-stealing queue model as workers 160 in worker group 116-1. In this arrangement, incoming work is naturally distributed across all batchers 150 in batcher groups 114 and all workers 160 in worker groups 116. This implementation need not manage the rates at which individual batchers 150 and/or individual workers 160 are running or the internal runtimes of each batcher 150 of a batcher group 114-1 or worker 160 of a worker group 116-1.

Figure 6:
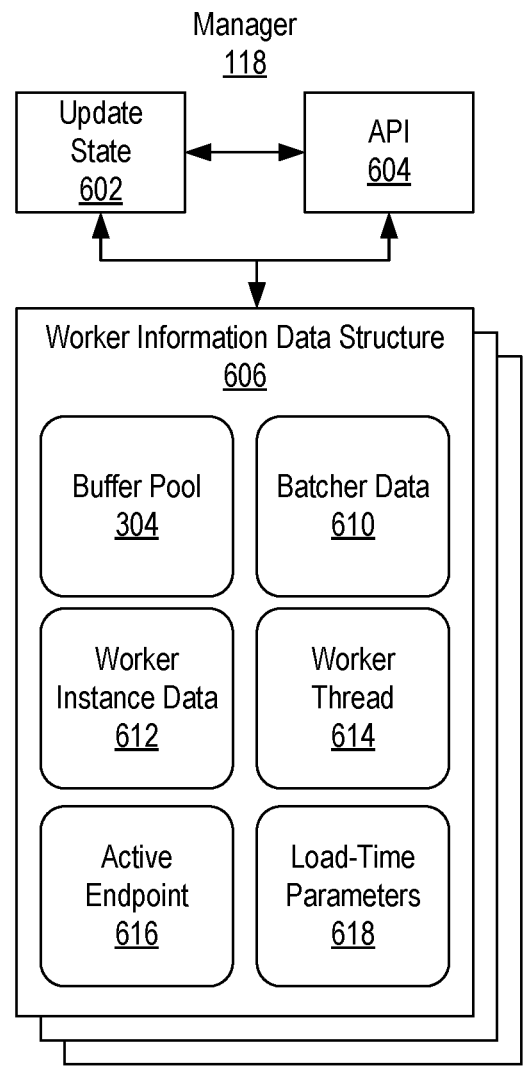
FIG. 6 illustrates an example implementation of a manager of an inference server.

FIG. 6 illustrates an example implementation of manager 118. In the example of FIG. 6, manager 118 includes an update state block 602, an API 604, and one or more worker information data structures 606. API 604 may be used by ingestion layer 102 to communicate with manager 118. FIG. 6 illustrates how manager 118 maintains the shared state of the various entities of inference server 100 executing in different threads of execution.

Referring to FIG. 6, the shared state refers to maintaining a record of the particular workers 160 that are currently active and the endpoints at which each such worker 160 may be reached. This information enables incoming requests to query the manager 118 to retrieve a pointer to the correct batcher group 114. The particular queues to be used may be saved within the respective batchers 150.

In the example of FIG. 6, update state block 602 executes in its own thread of execution. To manage multiple versions of workers 160 with potentially different configurations (e.g., different load-time parameters), manager 118 is capable of comparing the worker designation and any load-time parameters, if any, of the desired worker 160 to be started from received requests with the worker information data structures 606. Update state block 602 is capable of using the result, e.g., whether a match is found, to determine whether a worker 160 should be loaded (e.g., a new worker group started or a new worker 160 added to an existing worker group 116), or the request dropped.

In the case where a new instance of a worker 160 is loaded as part of an existing worker group 116 or an existing worker 160 or workers 160 of an existing worker group 116 is/are used, the previously allocated endpoint for the worker group 116 is returned to the requesting client system and may be used for subsequent inference requests directed to the worker group 116. In the case where the newly loaded worker does not match any existing workers, a new endpoint is reserved for the newly loaded worker 160 (e.g., as part of a new worker group 116) and returned to the client system. The endpoint may be used for subsequent inference requests directed to the worker 160.

In one or more example implementations, update state block 602 is capable of creating new endpoints by appending a number to a base endpoint string. In one aspect, the load-time parameters for a given worker and/or worker group may be stored in association with the worker group 116 as key-value pairs. In the example of FIG. 6, manager 118 is capable of creating a worker information data structure 606 for each worker 160 and/or for each worker group 116 executing or loaded in inference server 100. For each such worker 160, manager 118 is capable of storing, in a worker information data structure 606, buffer pool 304 (e.g., where buffers in buffer pool 304 are free), batcher data 610 indicating the batcher(s) 150 corresponding to the worker 160 and any threads of such batchers 150, worker instance data 612 indicating the particular instance of the class that implements the worker 160, worker thread 614 specifying the thread of the run method of the worker 160, the active endpoint 616 specifying the endpoint of the worker 160, and/or load-time parameters 618 specifying the load-time parameters, if any, of the worker 160.

Manager 118 provides methods, e.g., update state block 602, to safely modify the shared state such as by loading new workers 160 or unloading workers 160. In executing in its own thread, update state block 602 is capable of queuing received requests in this separate thread for safely managing the shared state of inference server 100. In general, update state block 602 is capable of serializing events from the various threads of execution within inference server 100 into a common timeline corresponding to the separate thread. The update state block 602, for example, may use the time that the events (e.g., requests) are received therein as the ground truth for managing the shared state.

For example, any methods that modify state enqueue requests to the update state block 602 executing in its own thread of execution. These methods may be called from a multi-threaded context and so multiple, duplicate or contradictory requests are possible. The queueing performed by update state block 602 enforces serialization of the requests and defines an ordering for all incoming requests. Update state block 602 is capable of processing the requests in this order. In doing so, any duplicate or contradictory requests can be dropped so the shared state of inference server 100 is not corrupted.

As an example, client system A and client system B each may issue a request to load a same worker 160 with same load-time parameters. These requests are serialized by update state block 602. Though the requests may be received at the same time via different threads of execution, update state block 602 serializes the two requests. The first request will be executed and cause the worker 160 to be loaded. The second request should make use of the worker 160 that was already loaded without reloading another instance of the same worker 160. In this example, post serialization, the update state block 602 may drop the second load request. In this example, the provided parameters in the request for a worker 160 from client system B (presuming this is later in time than the request from client system A after serialization) do not force the loading of another instance of the worker 160. In this example, the request from client system B is presumed not to include the parameters that force loading of a new instance of a worker 160.

In another example, client system A may request that a particular worker 160 be shut down. The specified worker 160, however, currently may be performing work for another client system B. In that case, the update state block 602 may implement a process that marks the worker 160 as "unready" while the shutdown procedure is initiated such that existing work is handled before shutdown. That is, the work currently being performed by the worker 160 for client system B will complete. This process, e.g., of marking the worker, prevents new work from being submitted to the worker 160.

Manager 118 is also capable of controlling shutdown operations including the order in which the different threads of execution in inference server 100 are ended and cleaned up to prevent memory corruption or undefined behavior. As an illustrative example, the manager 118 is capable of first bringing down workers 160 and joining the run threads of the workers 160. In response to destroying the workers 160, manager 118 is capable of stopping the batchers 150 and joining the threads used by the stopped batchers 150. The manager 118 itself shuts down prior to the inference server executable ending. For example, the thread of update state block 602 is joined prior to manager 118 shutting down.

Manager 118 is also capable of performing load balancing operations for inference server 100. With multiple workers 160 executing and utilizing different machine learning platforms simultaneously, work may be performed at different or uneven rates. Given the non-deterministic thread priority described herein and runtime variability, even the same worker's processing time may vary with different requests. Manager 118 is capable of addressing this situation using a number of techniques to ensure that work is distributed effectively without one slow worker 160 causing a bottleneck in the inference server 100.

In one or more example implementations, manager 118 is capable of allocating more buffers to existing worker groups 116. Allocating more buffers can improve performance by allowing for more simultaneously outstanding requests. Additional buffers may also be effective in keeping all the workers 160 busy in cases where additional time is needed to construct the requests (e.g., processing performed by the ingestion layer 102 and/or batching layer 104).

Additionally or in the alternative, manager 118 may allocate more workers 160 to a worker group 114. Since each worker 160 in a worker group 116 is identical, an incoming batch to the worker group 116 can be processed by any worker 160 in the worker group 116. The previously discussed work-stealing queue architecture may be used so that whichever worker 160 is idle in the worker group 116, such worker 160 is capable of obtaining work from the queue and operating on the work. A slow or slower worker 160 in the worker group 116 will simply execute a smaller percentage of the overall requests as that worker 160 will pull new requests (e.g., batches) from the queue less frequently than the others.

Additionally or in the alternative, manager 118 may allocate more batchers 150 in the same or similar manner as described above in connection with allocating more workers 160. In one aspect, manager 118 may allocate more batchers 150 in response to determining that latency and/or throughput of inference server 100 does not improve or does not improve by a sufficient amount responsive to loading one or more new workers 160.

In support of the operations described, manager 118 may be configured to collect internal metrics. These internal metrics may include, but are not limited to, queue sizes and the number of requests per worker 160 and/or worker group 116 over time to detect which services may be oversubscribed. Accordingly, depending on the configured policy, manager 118 may attempt to add more workers 160 to a worker group 116 to alleviate the load in response to detecting a high load (e.g., detecting a queue size exceeding a threshold and/or detecting that the number of requests for a given worker group 116-1 exceeds a threshold number of requests). Similarly, the manager 118 is capable of bringing down workers 160 that are determined to be idle for an amount of time exceeding a threshold amount of time. The number of buffers allocated to the worker group 116 can be scaled up or down depending on policy (e.g., any of the aforementioned metrics).

In one or more other example implementations, the inference server 100 may be implemented in a container environment as a containerized application. For example, inference server 100 may be implemented using an environment such as Kubernetes to facilitate deployment and scaling, e.g., load-balancing, across a cluster of compute nodes each running the inference server 100. In such an example implementation, the container environment, e.g., Kubernetes, is capable of tracking the number of concurrent requests per container. In response to determining that the number of requests to a given container exceeds a threshold number of requests, the environment may horizontally scale out the service by spawning a further container in the computing cluster. Incoming requests can then be routed to either instance of the inference server 100 to reduce the number of requests received by each respective instance of the inference server 100.

In accordance with the inventive arrangements described within this disclosure, inference server 100 is capable of performing additional functions that facilitate observation and management of internal operations. These additional functions may generally correspond to logging, metrics, and tracing. Within inference server 100, since the batchers 150 and the workers 160 run largely as black boxes, these additional tools allow the inference server 100 to detect any bottlenecks or entities that may be misbehaving. The various observation statements included in inference server 100 program code that facilitate these functions may be removed at compile time based on user preference through one or more preprocessor definitions.

The logging function refers to recording the occurrence and time of particular events within inference server 100. Logging may be configured to operate at any of a variety of different levels. These levels may range from highly verbose trace settings to errors only. Logging statements can be dispersed throughout the source code of the inference server 100. Depending on the desired level of logging, different ones of the logging statements are executed. For example, statements may be ranked according to logging level so that for a selected logging level, only those statements having a logging level at or above the selected logging level will be executed. In one aspect, inference server 100 is capable of logging events to a log file stored on non-volatile memory. The events may also be logged (e.g., conveyed) to a terminal where the application is running. The level of logging for conveyance of events to the terminal may differ from the level of logging used for log file. Both types of logging may be performed concurrently using these different logging levels.

Metrics are used to collect data about the state of inference server 100 and may be used to make decisions in real time. For example, the inference server 100 may determine that there are many requests for a certain worker group 116 and start to back up. These events may be tracked through metrics, for example, by maintaining a count of the queue size from which the worker group 116 pulls batches. Based on this information, inference server 100 is capable of adding another worker 160 to the worker group 116 to relieve pressure, e.g., responsive to the queue size exceeding a threshold. Similarly, in response to determining that a given worker group 116 includes a plurality workers 160 without a sufficient amount of work to keep the workers 160 of the worker group 116 busy, e.g., one or more of the workers 160 are idle for at least predetermined periods of time, inference server 100 may shut down one or more of the workers 160. These metrics facilitate real time monitoring and management of the load of the inference server 100 so that performance bottlenecks may be addressed (e.g., in real time).

Tracing measures the real time taken for a request to pass through inference server 100. Within the inference server 100, tracing is capable of determining the amount of time for a request to pass through each of the ingestion layer 102, batching layer 104, and execution layer 106. In one example implementation, each layer may append its own tracing data to the tracing data of the previous layer. As a result, the time taken in each layer and the delays between layers may be captured in a single trace. By aggregating this data, inference server 100 is capable of computing latencies. The inference server 100, for example, may compute latencies at different percentiles to evaluate real time performance that may be expected. Further, inference server 100 may add resources, e.g., buffers and/or workers 160, to reduce latencies in response to determining that latency exceeds a threshold amount.

The workers 160 and the batchers 150 are capable of accessing these capabilities (e.g., logging, metrics, and/or trace) in their internal methods to track and expose diagnostic data. Inference server 100 is capable of independently monitoring the input and output queues around a worker 160 and/or batcher 150 to keep track of what the component sees in terms of traffic and/or workload without having to add such functionality to the workers 160 themselves. If a particular worker group 116 is being overwhelmed with requests, for example, inference server 100 is capable of adding more workers 160 to the worker group 116 to ease congestion. This dynamic scaling is independent of external orchestration tools such as Kubernetes as previously discussed. By integrating with other technologies, e.g., container technologies such as Kubernetes, this information can be used to help determine when to add more instances of the inference server 100 to a computing cluster.

The example software architecture(s) of inference server 100 described herein provide a flexible arrangement that addresses a variety of issues of conventional server adaptations for handling inference processing. For example, with some conventional server architectures, requests may be handled completely by a request handler. Due to the time-consuming nature of handling requests, and particularly inference requests, data backups may occur which limit the number of requests that may be handled and slow response times.

The batching capabilities performed in the batching layer 104 take advantage of the batching capabilities of certain hardware accelerators. Because workers 160 and batchers 150 may be targeted to particular hardware accelerators, the inference server 100 is capable of meeting the batching requirements of different types of hardware accelerators that may be used concurrently to serve inferencing requests.

The software architecture allows layers such as the ingestion layer 102 to continue processing newly received requests while other layers such as the execution layer 106 interact with different machine learning platforms including hardware accelerators. This allows the ingestion layer 102 to continue operating without having to wait for asynchronous operation of hardware resources such as hardware accelerators to complete processing. Further, any CPU based accelerators (e.g., implemented in a worker), are able to operate synchronously.

The software architecture also decouples the particular type of request format from the remainder of the processing performed by the inference server 100. That is, received inference requests are placed into an interface object that is commonly understood by entities of the system. The interface object includes the necessary methods to extract the data into buffers during batching. Because the needed methods are included in the interface object itself, the inference server 100 is largely decoupled from these different request formats or protocols. The particular workers 160 that operate on the requests may be configured to understand the particular request format or protocol for purposes of inference processing.

Figure 7:
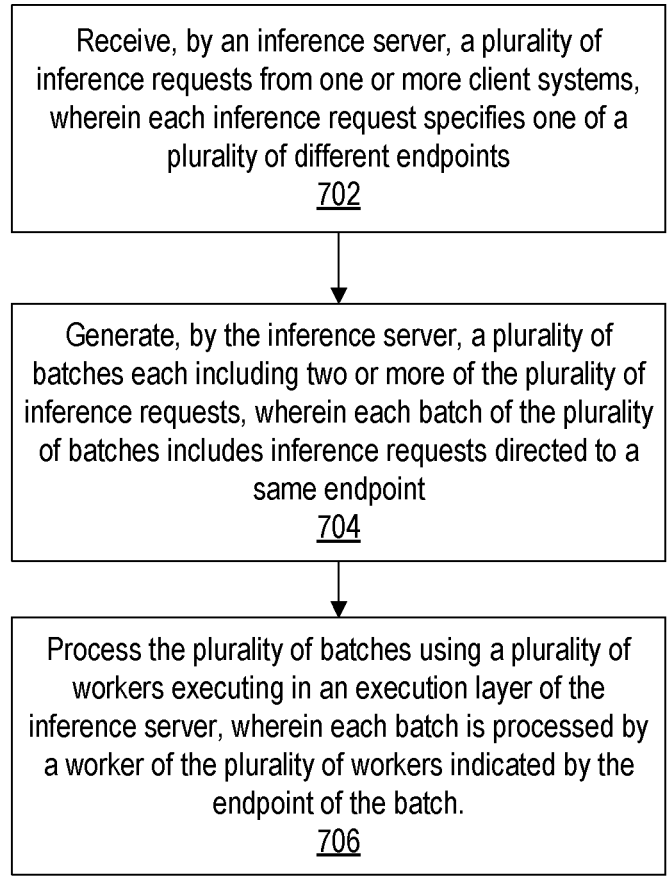
FIG. 7 is an example method illustrating certain operative features of an inference server in accordance with the inventive arrangements described herein.

FIG. 7 is an example method 700 illustrating certain operative features of an inference server in accordance with the inventive arrangements described herein. In block 702, the inference server 100 is capable of receiving a plurality of inference requests from one or more client systems 302. Each inference request specifies one of a plurality of different endpoints. In block 704, the inference server 100 generates a plurality of batches each including one or more of the plurality of inference requests. Each batch of the plurality of batches includes inference requests directed to a same endpoint. In block 706, the inference server 100 processes the plurality of batches using a plurality of workers 160 executing in an execution layer 106. Each batch is processed by a worker 160 of the plurality of workers 160 indicated by the endpoint of the batch.

The foregoing and other implementations can each optionally include one or more of the following features, alone or in combination. Some example implementations include all the following features in combination.

In one aspect, each worker 160 of the plurality of workers 160 is configured to invoke one of a plurality of different machine learning platforms to process batches. A machine learning platform may be a machine learning framework (120), a machine learning model (122), or a hardware accelerator (124). As discussed, the inference server 100, by way of executing a plurality of workers 160, is capable of interacting with and using a plurality of different machine learning platforms simultaneously. This includes interacting with and using a plurality of different types of hardware accelerators concurrently.

In another aspect, the plurality of inference requests may be received by an ingestion layer 102 of the inference server 100. The ingestion layer 102 may include one or more request servers 112. The plurality of batches may be generated by a plurality of batchers 150 of a batching layer 104 of the inference server 100. The ingestion layer 102 is communicatively linked with the plurality of batchers 150 of the batching layer 104 by a plurality of first queues 108. The plurality of batchers 150 are communicatively linked with the plurality of workers 160 by a plurality of second queues 110.

In another aspect, the plurality of workers 160 include a worker group 116-1 having one or more workers 160 that are the same and that have same runtime parameters. Each worker 160 in the worker group 116 obtains batches for processing from a selected second queue of the plurality of second queues 110. That is, each worker 160 of the worker group 116 obtains batches from a same queue 110 of the plurality of second queues 110.

In another aspect, the worker group 116 corresponds to a batcher group 114. Each batcher 150 in the batcher group 114 is a same batcher, wherein each batcher 150 in the batcher group 114 obtains inference requests from the ingestion layer 102 from a selected first queue 108 of the plurality of first queues 108 and provides generated batches to the worker group 116 via the selected second queue 110 of the plurality of second queues 110. For example, each batcher 150 of the batcher group 114-1 obtains interface objects from the same queue 108-1 (e.g., a same input queue) and outputs generated batches to the same queue 110-1 (e.g., a same output queue).

In another aspect, each batcher 150 of the plurality of batchers 150 and each worker 160 of the plurality of workers 160 executes in an individual thread of execution.

In another aspect, the ingestion layer 102 includes a plurality of different request servers 112 configured to receive the plurality of inference requests.

In another aspect, each request server 112 of the plurality of different request servers 112 executes a plurality of different threads of execution.

In another aspect, each inference request of the plurality of inference requests may be included in an interface object.

The interface objects are common across the plurality of different endpoints. The interface objects are processed to generate the batches.

In the examples described within this disclosure, the inference server 100 is described in the context of delivering inference results and supports the loading and/or unloading workers 160. In one or more other example implementations, the inference server 100 is capable of performing additional operations relating to the training phase or development of machine learning models. Such operations may include, for example, compiling and/or quantizing machine learning models. These additional operations may be made available, or exposed, to client systems for use.

For example, the inference server 100 may receive requests from client systems for compiling and/or quantizing a client system specified machine learning model. Through this process, the client system may interact with the inference server 100 to prepare a machine learning model and make the machine learning model available for performing inference using the software-based worker architecture described herein. The inference server 100, for example, may implement one or more endpoints that are capable of performing the compilation and/or quantization operations as specified by received client system requests. This allows the inference server 100 to be used as an end-to-end inference system capable of preparing machine learning models, deploying machine learning models, and using the machine learning models for performing inference. Any machine learning models that are prepared by the inference server 100 may be stored in the file system on the hardware on which the inference server 100 runs so that the inference server may access such models.

The inference server 100 may support multiple modes of interaction. For example, the inference server 100 may support interaction through a terminal, through client APIs, and/or through a graphical user interface (GUI). In example implementations where GUI-based interaction is supported, inference server is capable of generating GUI-based visualizations, e.g., graphs, illustrating server load, what entities are executing and/or are available, and/or any collected observational data (e.g., metrics, logs, and traces). Such data may be presented and updated in real time.

In one or more examples, the GUI may host demos to illustrate new functionality or demonstrate how a particular feature operates. In addition to managing the deployment, the GUI can integrate the model compiler tools/frameworks to allow users to partition, quantize, and compile machine learning models and deploy the machine learning models for use in inference processing. This end-to-end integration and support for such integration by way of multiple modes of interaction facilitates seamless transition from modeling to deployment. In one aspect, the GUI may be hosted by the inference server 100 itself. In another aspect, the GUI may be hosted by another data processing system that is configured to manage multiple inference servers running on a cluster, for example.

Figure 8:
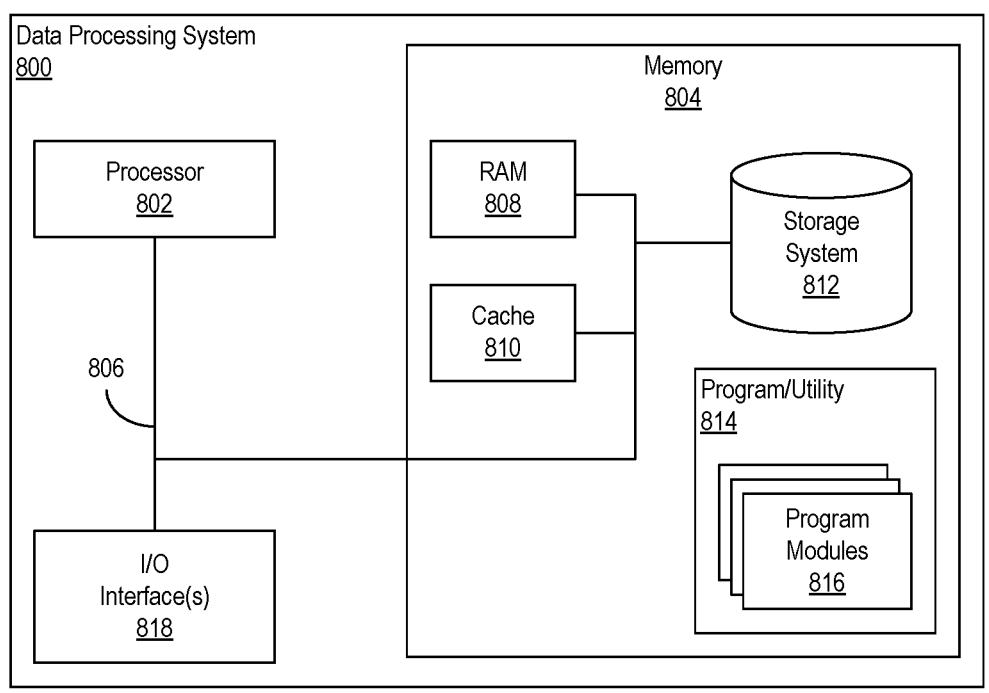
FIG. 8 illustrates an example implementation of a data processing system for executing the inference server of FIG. 1.

FIG. 8 illustrates an example implementation of a data processing system 800. As defined herein, "data processing system" means one or more hardware systems configured to process data, each hardware system including at least one processor programmed to initiate operations and memory.

The components of data processing system 800 can include, but are not limited to, a processor 802, a memory 804, and a bus 806 that couples various system components including memory 804 to processor 802. Processor 802 may be implemented as one or more processors. In an example, processor 802 is implemented as a central processing unit (CPU). As defined herein, the term "processor" means at least one circuit capable of carrying out instructions contained in program code. The circuit may be an integrated circuit or embedded in an integrated circuit. Processor 802 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 806 represents one or more of any of a variety of communication bus structures. By way of example, and not limitation, bus 806 may be implemented as a Peripheral Component Interconnect Express (PCIe) bus.

Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Program/utility 814, having a set (at least one) of program modules 816, may be stored in memory 804. Program/utility 814 is executable by processor 802. By way of example, program modules 816 may represent an operating system, one or more application programs, other program modules, and program data. For example, one or more program modules 816 may implement inference server 100 and/or any software-based machine learning platforms. Program modules 816, upon execution, cause data processing system 800, e.g., processor 802, to carry out the functions and/or methodologies of the example implementations described within this disclosure.

Program/utility 814 and any data items used, generated, and/or operated upon by data processing system 800 are functional data structures that impart functionality when employed by data processing system 800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 800 may include one or more Input/Output (I/O) interfaces 818 communicatively linked to bus 806. I/O interface(s) 818 allow data processing system 800 to communicate with one or more external systems and/or devices and/or communicate over one or more networks such as a local area network (LAN), a wide area network (WAN), and/or a public network (e.g., the Internet). Examples of I/O interfaces 818 may include, but are not limited to, network cards, modems, network adapters, hardware controllers, etc. Examples of external devices also may include devices that allow a user to interact with data processing system 800 (e.g., a display, a keyboard, and/or a pointing device) and/or other devices such as accelerator card.

Via I/O interfaces 818, data processing system 800 may be communicatively linked with one or more other systems including, but not limited to, other data processing systems executing software-based machine learning platforms and/or hardware accelerators.

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 8 is not intended to suggest any limitation as to the scope of use or functionality of example implementations described herein. Data processing system 800 is an example of computer hardware that is capable of performing the various operations described within this disclosure. In this regard, data processing system 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 800 may be operational with numerous other general-purpose or special-purpose computing system environments or configurations. Examples of computing systems, environments, and/or configurations that may be suitable for use with data processing system 800 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 800 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
receiving, by an inference server executed by one or more data processing systems, a plurality of inference requests from a plurality of client systems, wherein each inference request specifies one of a plurality of different endpoints;
forming a plurality of interface objects by including, within each interface object, an inference request of the plurality of inference requests and a callback function specific to the inference request;
generating, by the inference server, a plurality of batches each including one or more of the plurality of inference requests directed to a same endpoint as extracted from the interface objects;
processing the plurality of batches using a plurality of workers executing in an execution layer of the inference server, wherein each batch is processed by a worker of the plurality of workers indicated by the endpoint of the batch; and
for each inference object generated from the processing of a selected inference request, invoking the callback function specific to the selected inference request to provide the inference object to a selected client system of the plurality of client systems that submitted the inference request, wherein the callback function implements a protocol-specific response matching a protocol used by the selected client system in submitting the inference request.

2. The method of claim 1, wherein each worker of the plurality of workers is configured to invoke one of a plurality of different machine learning platforms to process batches.

3. The method of claim 1, wherein:
the receiving the plurality of inference requests is implemented by an ingestion layer of the inference server;
the generating the plurality of batches is implemented by a plurality of batchers of a batching layer of the inference server;
the ingestion layer is communicatively linked with the plurality of batchers of the batching layer by a plurality of first queues; and
the plurality of batchers are communicatively linked with the plurality of workers by a plurality of second queues.

4. The method of claim 3, wherein:
the plurality of workers includes a worker group having one or more same workers having same runtime parameters, wherein each worker in the worker group obtains batches for processing from a selected second queue of the plurality of second queues.

5. The method of claim 4, wherein:
the worker group corresponds to a batcher group, wherein each batcher in the batcher group is a same batcher, wherein each batcher in the batcher group obtains inference requests from the ingestion layer from a selected first queue of the plurality of first queues and provides generated batches to the worker group via the selected second queue of the plurality of second queues.

6. The method of claim 1, wherein one or more batches of the plurality of batches are generated by batching inference requests directed to the same endpoint as received during a particular amount of time.

7. The method of claim 3, wherein the ingestion layer includes a plurality of different request servers configured to receive the plurality of inference requests.

8. The method of claim 7, wherein each request server of the plurality of different request servers executes a plurality of different threads of execution.

9. The method of claim 1, further comprising:
including each inference request of the plurality of inference requests in an interface object, wherein the interface objects are common across the plurality of different endpoints;
wherein the interface objects are processed to generate the batches.

10. A system, comprising:
a processor configured to execute an inference server, wherein the processor, in executing the inference server, is configured to initiate operations including:
receiving a plurality of inference requests from a plurality of client systems, wherein each inference request specifies one of a plurality of different endpoints;
generating a plurality of batches each including one or more of the plurality of inference requests directed to a same endpoint;
processing the plurality of batches using a plurality of workers executing in an execution layer of the inference server, wherein each batch is processed by a worker of the plurality of workers indicated by the endpoint of the batch; and
wherein each worker of the plurality of workers is configured to invoke one of a plurality of different machine learning platforms, and wherein the plurality of different machine learning platforms includes a plurality of different hardware accelerators that are concurrently invokable by selected workers of the plurality of workers.

11. The system of claim 10, wherein:
the receiving the plurality of inference requests is implemented by an ingestion layer of the inference server;
the generating the plurality of batches is implemented by a plurality of batchers of a batching layer of the inference server;
the ingestion layer is communicatively linked with the plurality of batchers of the batching layer by a plurality of first queues; and
the plurality of batchers are communicatively linked with the plurality of workers by a plurality of second queues.

12. The system of claim 11, wherein:
the plurality of workers includes a worker group having one or more same workers having same runtime parameters, wherein each worker in the worker group obtains batches for processing from a selected second queue of the plurality of second queues.

13. The system of claim 12, wherein:
the worker group corresponds to a batcher group, wherein each batcher in the batcher group is a same batcher, wherein each batcher in the batcher group obtains inference requests from the ingestion layer from a selected first queue of the plurality of first queues and provides generated batches to the worker group via the selected second queue of the plurality of second queues.

14. The system of claim 10, wherein one or more batches of the plurality of batches are generated by batching inference requests directed to a same endpoint as received during a particular amount of time.

15. The system of claim 11, wherein:
the ingestion layer includes a plurality of different request servers configured to receive the plurality of inference requests.

16. The system of claim 15, wherein each request server of the plurality of different request servers executes a plurality of different threads of execution.

17. The system of claim 10, wherein the processor is configured to initiate operations further comprising:
including each inference request of the plurality of inference requests in an interface object, wherein the interface objects are common across the plurality of different endpoints;
wherein the interface objects are processed to generate the batches.

18. A computer program product, comprising:
one or more computer readable storage media, and program instructions collectively stored on the one or more computer readable storage media, wherein the program instructions are executable by computer hardware to implement an inference server, wherein the computer hardware, in executing the inference server, is configured to initiate operations including:
receiving a plurality of inference requests from a plurality of client systems, wherein each inference request specifies one of a plurality of different endpoints;
forming a plurality of interface objects by including, within each interface object, an inference request of the plurality of inference requests and a callback function specific to the inference request;
generating a plurality of batches each including one or more of the plurality of inference requests directed to a same endpoint as extracted from the interface objects;
processing the plurality of batches using a plurality of workers executing in an execution layer of the inference server, wherein each batch is processed by a worker of the plurality of workers indicated by the endpoint of the batch; and
for each inference result generated from the processing of a selected inference request, invoking the callback function specific to the selected inference request to provide the inference result to a selected client system of the plurality of client systems that submitted the inference request using a protocol matching a protocol used by the selected client system in submitting the inference request.

19. The computer program product of claim 18, wherein each worker of the plurality of workers is configured to invoke one of a plurality of different machine learning platforms to process batches.

* * * * *